United States Patent [19]

Mikado

[11] 4,163,361
[45] Aug. 7, 1979

[54] TELEVISION TIME SIGNAL GENERATOR

[75] Inventor: Tsuneo Mikado, Hachioji, Japan

[73] Assignee: Nippon Television Industry Corporation, Hachioji, Japan

[21] Appl. No.: 783,775

[22] Filed: Apr. 1, 1977

[30] Foreign Application Priority Data

Jun. 15, 1976 [JP] Japan .................. 51-69934

[51] Int. Cl.$^2$ ............................................. G04B 19/34
[52] U.S. Cl. .................. 58/50 R; 58/23 R; 58/35 W
[58] Field of Search ............ 358/81, 82; 340/324 AC; 58/23 R, 35 W, 24 R, 25, 26 R, 50 R

[56] References Cited

U.S. PATENT DOCUMENTS

| 2,188,145 | 6/1940 | Frantz | 58/24 R |
| 2,671,131 | 3/1954 | Johnson | 58/24 R X |
| 3,439,492 | 4/1969 | Gravenson | 58/50 R X |
| 3,551,589 | 12/1970 | Moskovitz | 358/82 |
| 3,854,279 | 12/1974 | Edmunds | 58/50 R |
| 4,006,585 | 2/1977 | Tamaru et al. | 58/50 R |

*Primary Examiner*—Ulysses Weldon
*Attorney, Agent, or Firm*—Woodcock, Washburn, Kurtz & Mackiewicz

[57] ABSTRACT

A time signal generator for generating a television signal to display time with characters, figures or combinations of them, includes means for applying to the time signal a color component varying in a predetermined order with time, whereby the color of the time display is varied in the predetermined order with time.

8 Claims, 17 Drawing Figures

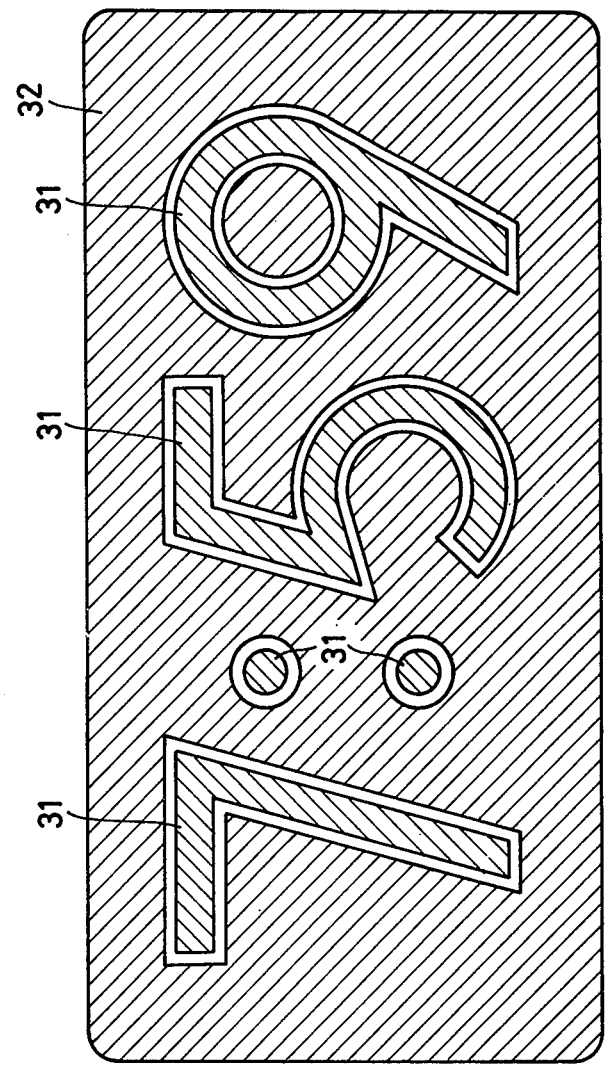

TELEVISION TIME SIGNAL GENERATOR

BACKGROUND OF THE INVENTION

1. Field of the Invention

This invention relates to a television time signal generator for generating a time signal to display time with characters, figures or combinations of them, and more particularly to a television time signal generator for generating a time signal to display the time on the picture of a television receiver.

2. Description of the Prior Art

Hitherto, the time has been displayed on the picture of a television receiver. However, the minimum unit of the displayed time is one minute. Accordingly, a TV viewer cannot know the time with the accuracy of a second unit. Moreover, since the figures to display the time are relatively small, it is difficult for the TV viewer to discriminate the time at a place being distant to some extent from the picture of the television receiver.

SUMMARY OF THE INVENTION

An object of this invention is to provide a television time signal generator which can generate a time signal at least one part of which is varied in color in a predetermined order in accordance with time.

Another object of this invention is to provide a television time signal generator in which the minimum unit of the time displayed with characters of figures is one minute, but which can generate a time signal varying in color, whereby the TV viewer can discriminate the time of a second unit to a certain degree.

A further object of this invention is to provide a television time signal generator which can generate a time signal varying in color by which the TV viewer can know the time to a certain degree even in the case that the characters or figures to display time cannot be clearly discriminated.

A still further object of this invention is to provide a television time signal generator which can generate a time signal the color variations of which are distinctive and clear, and yet which is of simple construction.

In accordance with one aspect of this invention, a television time signal generator comprises a pattern signal generator for generating a pattern signal for time display on a television picture tube of characters, figures or a combination and means for applying to said pattern signal a color component which varies in a predetermined order in accordance with the passage of time, whereby the color of said time display is varied in said predetermined order to represent the value of time increments.

The other objects, features and advantages of this invention will be apparent from the following description taken in conjunction with the accompanying drawings.

BRIEF DESCRIPTION OF THE DRAWINGS

FIG. 5 is a front view showing another method to display the time by the time signal generator of FIG. 1.

DESCRIPTION OF THE PREFERRED EMBODIMENTS

A television time signal generator according to one embodiment of this invention will be described with reference to FIG. 1 to FIG. 4.

Figure 1:
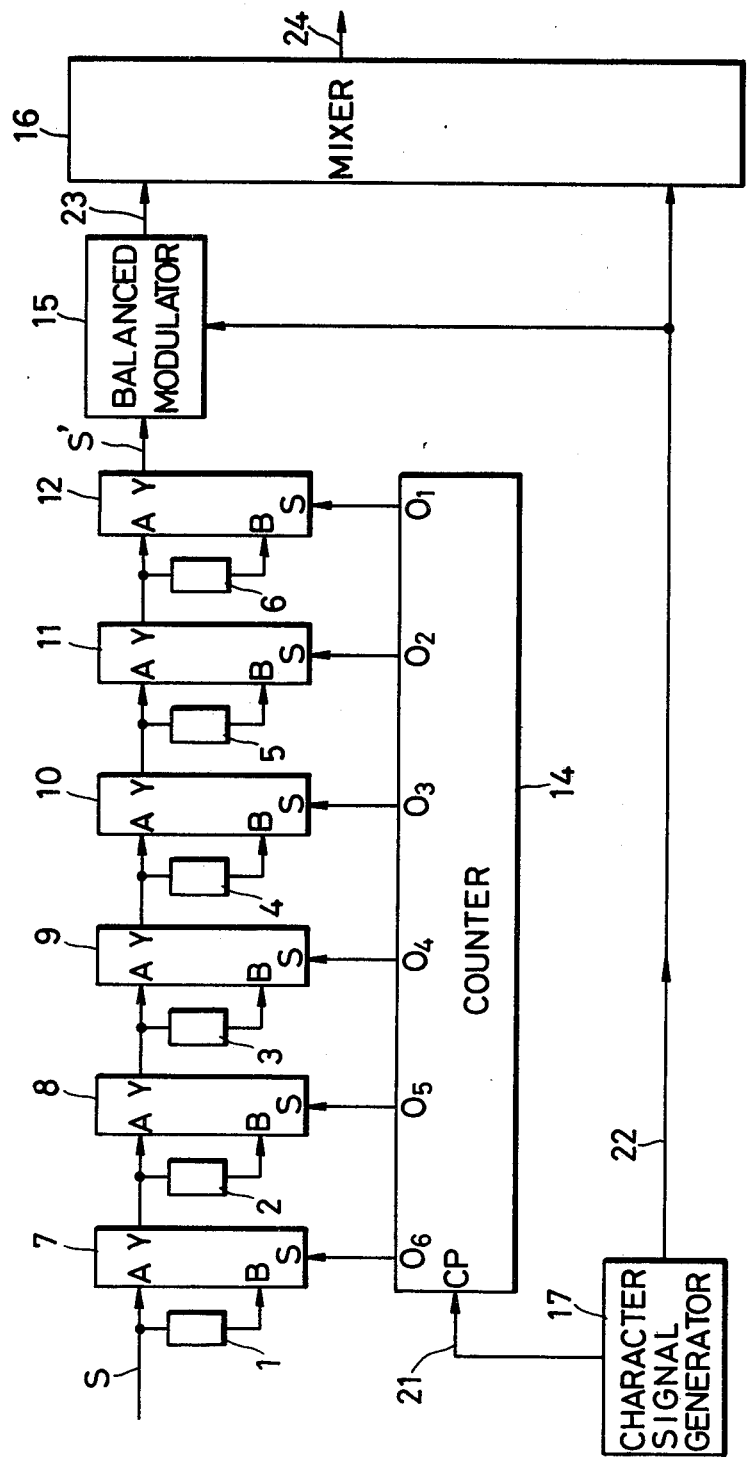
FIG. 1 is a block diagram of a time signal generator according to one embodiment of this invention.
Figure 2:
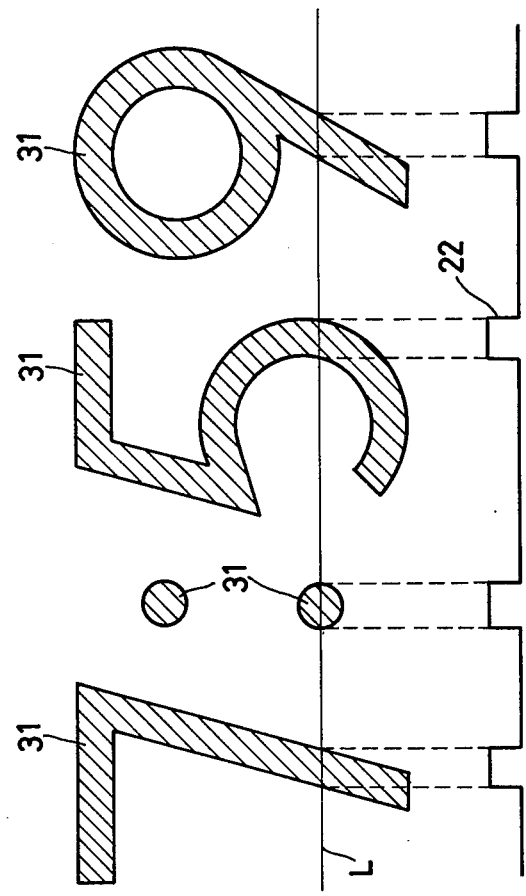
FIG. 2A is a front view of the characters to display the time, generated on the picture of a TV receiver by the time signal generator of FIG. 1.
FIG. 2B is a wave form of the character signal on the horizontal scanning line L in the screen of the TV receiver shown in FIG. 2A.

Referring to FIG. 1, the time signal generator includes a character signal generator 17, a counter 14, delay lines 1 to 6, line selectors 7 to 12, a balanced mudulator 15 and a mixer 16. In FIG. 1, the character signal generator 17 includes a clock portion, for example, consisting of a crystal oscillator and a counter, and a decoding circuit or pattern signal generator for generating a character signal to display time on the picture of a television receiver in dependence on the output of the clock portion. For example, characters 31 representing hour and minute, as shown in FIG. 2A, are displayed on the picture of the TV receiver. A character signal 22 for displaying the time of FIG. 2A is generated on the horizontal scanning line L of the picture of the TV receiver, as shown in FIG. 2B. The character signal 22 is applied from the character signal generator 17 to the balanced modulator 15 and the mixer 16.

Figure 3:
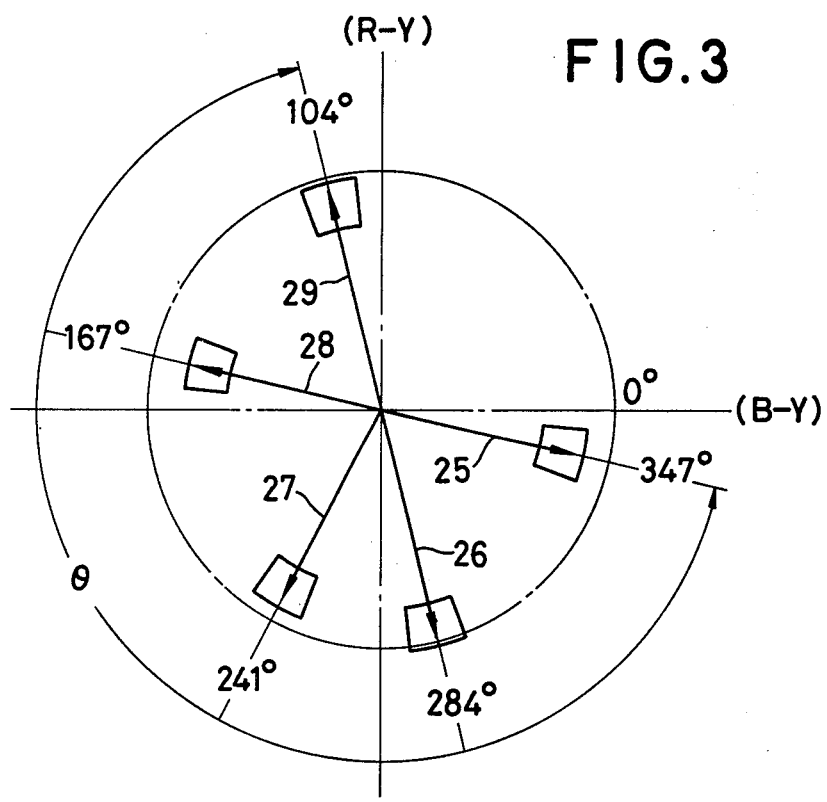
FIG. 3 is a vector diagram showing the variation of the hue or color of the characters shown in FIG. 2A.

According to the time signal generator of FIG. 1, hue of the characters 31 of the hour's and minute's units varies every second. Thus, the second's unit can be discriminated. FIG. 3 shows a vector diagram for hue variation of the time display. In this embodiment, the hue stepwisely varies every second in such a predetermined order of wave lengths of colors, as blue 25→cyanic 26→green 27→yellow 28→red 29→blue 25, at the period of sixty seconds during the time of zero to sixty seconds.

In FIG. 1, a chrominance subcarrier S accordant with a color burst signal in phase is supplied to the delay line 1 and to the terminal A of the line selector 7. The chrominance subcarrier S is preferably a sinusoid having a waveform similar to that shown in FIG. 4A. This waveform may be derived from any suitable signal source such as a crystal oscillator. The delay lines 1 to 6 operate to delay the chrominance subcarrier S, and have respectively delay times T/2, T/4, T/8, T/16, T/32 and T/64, where T represents a predetermined delay time. The total of the delay times of the delay lines 1 to 6 correspond to a phase $\theta$ to be described hereafter. A delay time unit corresponding to $\theta/59$ is required. Accordingly, the delay time T is so predetermined that T/64 corresponds to $\theta/59$.

The delay lines 1 to 6 are connected to the line selectors 7 to 12, respectively. In the line selectors 7 to 12, a terminal Y is connected to a terminal A when a signal "0" is applied to a terminal S, and the terminal Y is connected to a terminal B when a signal "1" is applied to the terminal S. For example, when a delay time 5T/64 is required, the terminals Y are connected to the terminals B in the delay lines 10 and 12, and the terminals Y are connected to the terminals A in the other delay lines 7, 8, 9 and 11. In that case, the chrominance subcarrier S passes through the delay lines 4 and 6, but not through the other delay lines 1, 2, 3, and 5. The chrominance subcarrier S is delayed by T/16 +T/64 (=5T/64). The delay signal S' is obtained from the last line selector 12.

The outputs $0_1$ to $0_6$ of the counter 14 are applied to the terminals S of the line selectors 7 to 12, respectively. Clock pulses 21 are supplied from the clock portion of the character signal generator 17 to the terminal CP of the counter 14, and counted by the counter 14. The line selectors 7 to 12 are switch-controlled with the outputs $0_1$ to $0_6$ of the counter 14. The function of the counter 14 may be decided by the object of use to be described hereafter. For example, when the clock pulses 21 of 1HZ are supplied to the terminal CP of the counter 14, the counter 14 may be a 60-counting counter.

The output signal S' of the line selector 12 is applied to the balanced modulator 15, and balance-modulated with the character signal 22 applied from the character signal generator 17. An output signal 23 of the balanced modulator 15 is applied as a chrominance signal, which is normally obtained by modulating a chrominance subcarrier with a chromaticity signal, to the mixer 16, and is mixed with the character signal 22 as a luminance signal therein. The mixed signal is led out as a video signal 24 from the mixer 16.

With the video signal 24, the hue of the character 31 varies periodically in the order of wave lengths of colors, as blue→cyanic→green →yellow→red. The chrominance signal to obtain such video signal 24 has the phase relationship as shown in FIG. 3, with respect to the respective colors. When the hue of the characters varies as blue→cyanic→green→yellow→red, the phase $\theta$ of the chrominance signal changes by 243 degrees (=347 degrees −104 degrees) from 347 degrees to 104 degrees. The above described delay time T is determined on the basis of the phase $\theta$.

Next, operations of the circuit of FIG. 1 will be described. For simplification of description, it is assumed that the chrominance subcarrier S applied to the first delay line 1 and line selector 7 is in the same phase as the blue chrominance signal 25.

The counter 14 is a logistic (60-counting) counter. When the counter 14 does not yet count the clock pulses 21, or when it has just counted the sixty clock pulses 21, the output of the counter 14 is $0_1=0_2=0_3=0_4=0_5=0_6=$"0". When all of the outputs $0_1$ to $0_6$ are "0", the chrominance subcarrier S is applied as the blue chrominance signal 25 to the balanced modulator 15, without delay. Next, when the counter 14 counts one clock pulse 21, the output $0_1$ is "1", and the output $0_2$ to $0_6$ are "0". At that time, the chrominance subcarrier S is delayed T/64 by the delay line 6, and so corresponds to the chrominance signal shifted by $\theta/59$ in the counter-clockwise direction from the blue chrominance signal 25 (FIG. 3).

When the counter 14 counts forth four clock pulses, the chrominance subcarrier S is delayed by about 180 degrees from the blue chrominance signal 25 and so corresponds to the yellow-chrominance signal 28 shown in FIG. 3. When the counter 14 counts fifty nine clock pulses 21, the chrominance subcarrier S is delayed by 243 degrees from the blue chrominance signal 25, and so corresponds to the red chrominance signal 29. And when the counter 14 counts sixty clock pulses 21, all of the outputs $0_1$ to $0_6$ are put in the initial condition and become "0". At that time, the chrominance subcarrier S is not delayed, and so instantaneously changes to the original blue chrominance signal 25 from the red chrominance signal 29. Hereafter, the above-described operation is repeated.

Figure 4A:
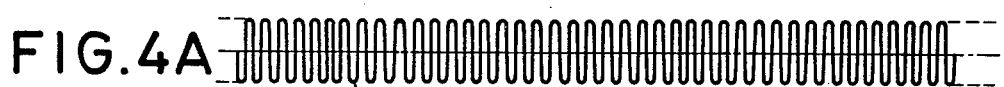
FIG. 4A to FIG. 4D are wave forms of signals at different parts of the time signal generator of FIG. 1.
Figure 4B:
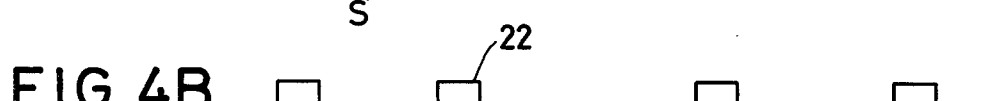
Figure 4C:
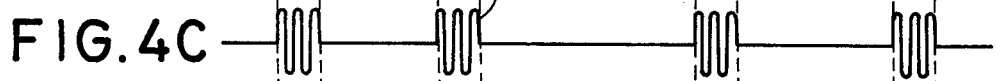
Figure 4D:

The delayed chrominance subcarrier S' thus obtained is applied to the balanced modulator 15, and balance-modulated by the character signal 22. The delayed chrominance subcarrier S' and the character signal 22 are shown in FIG. 4A and FIG. 4B, respectively. The output signal 23 shown in FIG. 4C is obtained from the balanced modulator 15, and is applied as the chrominance signal to the mixer 16. The character signal 22 as the luminance signal, and the chrominance signal 23 are mixed with each other in the mixer 16. The video signal 24 shown in FIG. 4D is obtained from the mixer 16.

As the result, the hue of the characters 31 to display time varies as blue→cyanic→green→yellow→red→blue, every second. The variation is repeated at the period of sixty seconds. The video signal 24 for time display obtained from the mixer 16 is further mixed with another normal video signal (picture signal), and transmitted as electronic wave from the transmitting station.

As shown in FIG. 5, only a background portion 32 for the characters 31 may be changed in hue. In that case, a pattern signal 22 for the background portion 32 is formed by an inverted signal to the character signal 22, and a region signal for display of rectangular shape. In FIG. 1, the pattern signal $\overline{22}$ is applied to the mixer 16 and the balanced modulator 15, instead of the character signal 22.

Alternatively, the hue of the background portion 32 may be constantly in dark tone, in order to more clearly display time. In that case, a predetermined chrominance signal is mixed with the pattern signal $\overline{22}$. The pattern signal $\overline{22}$ and the character signal for display of the characters 31 shown in FIG. 2A are applied to the balanced modulator 15 and the mixer 16. Thus, the composite picture of the character 31 and the background portion 32 can be obtained, as shown in FIG. 5.

Next, a time signal generator according to another embodiment of this invention will be described with reference to FIG. 6 and FIG. 7A to FIG. 7B.

Figure 6:
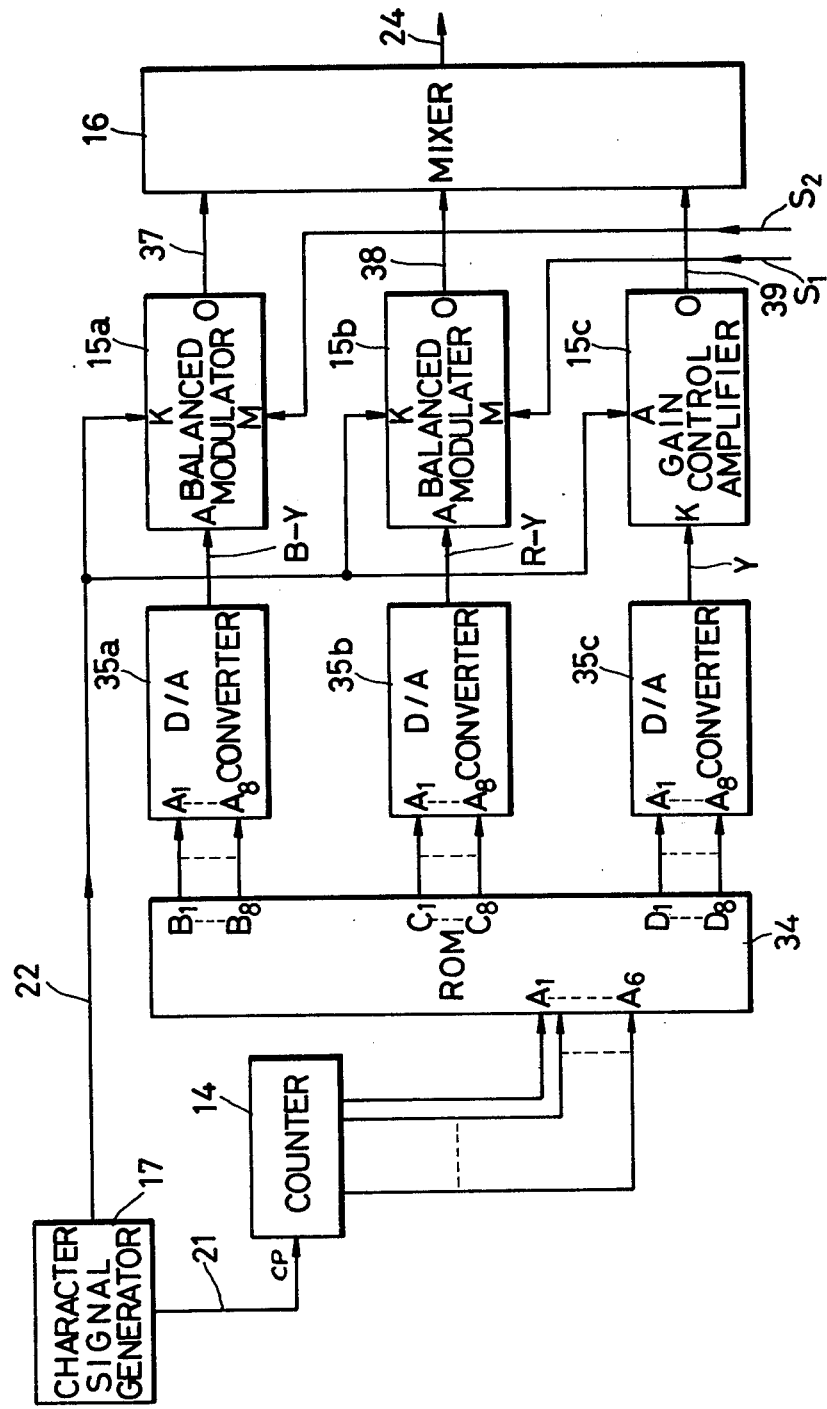
FIG. 6 is a block diagram of a time signal generator according to another embodiment of this invention.

Referring to FIG. 6, the time signal generator includes a character signal generator 17, the counter 14, read-only memory (ROM) 34, DA converters 35a, 35b and 35c, balanced modulators 15a and 15b, a gain control amplifier 15c and the mixer 16.

The character signal 22 obtained from the character signal generator 17 to display time is applied to the balanced modulators 15a and 15b, and the gain control amplifier 15c, as described hereafter. And the clock pulses 21 obtained from the clock portion of the character signal generator 17 are supplied to the CP terminal of the counter 14. The binary second-signal is applied to input terminals $A_1$ to $A_6$ of the ROM 34 from the counter 14. With the application of the second signal to the ROM 34, two coded chromaticity signals and one coded luminance signal are read out from the ROM 34. The coded chromaticity signal (B−Y) is obtained from one set of output terminals $B_1$ to $B_8$ of the ROM 34. The coded chromaticity signal (R−Y) is obtained from another set of output terminals $C_1$ to $C_8$ of the ROM 34. And the coded luminance signal Y is obtained from a still another set of output terminals $D_1$ to $D_8$ of the ROM 34. The coded chromaticity signals (B−Y) and (R−Y), and the luminance signal Y are supplied to input terminals $A_1$ to $A_8$ of the DA converters 35a, 35b and 35c, respectively, and so converted to voltage levels, respectively. The chromaticity signals (B−Y) of $2^8$ different voltage levels are obtained from the DA converter 35a in accordance with the input signals to the DA converter 35a. The chromaticity signals (R−Y) of $2^8$ different voltage levels are obtained from the DA converter 35b in accordance with the input signals to the DA converter 35b. And the luminance signals Y of $2^8$ different voltage levels are obtained from the DA converter 35c in accordance with the input signals to the DA converter 35c. The chromaticity signals (B−Y) and (R−Y) are supplied to input terminals A of the balanced modulators 15a and 15b, respectively. And the luminance signal Y is supplied to a gain control terminal K of the gain control amplifier 15c.

The chromaticity signals applied to the input terminals A of the balanced modulators 15a and 15b are balance-modulated by carriers applied to input terminals M of the balanced modulators 15a and 15b, respectively. A chrominance subcarrier $S_1$ as shown in FIG. 7A is supplied to the carrier input terminal M of the balanced modulator 15b. Another chrominance subcarrier $S_2$ delayed by 90 degrees in phase from the one chrominance subcarrier $S_1$, as shown in FIG. 7B, is supplied to the carrier input terminal M of the balanced modulator 15a. The subcarriers $S_1$ and $S_2$ shown in FIGS. 7A and 7B are derived from any suitable signal source such as a crystal oscillator and a 90° phase shifter. Only when the input signals applied to control terminals K of the balanced modulators 15a and 15b are at higher levels, the balanced modulators 15a and 15b work to modulate the chromaticity signals applied to the input terminals A of the balanced modulators 15a and 15b, respectively. The character signal 22 (FIG. 2B and FIG. 7C) is supplied to the control terminals K of the balanced modulators 15a and 15b.

Figures 7A, 7B, 7C, 7D, 7E, 7F, 7G:
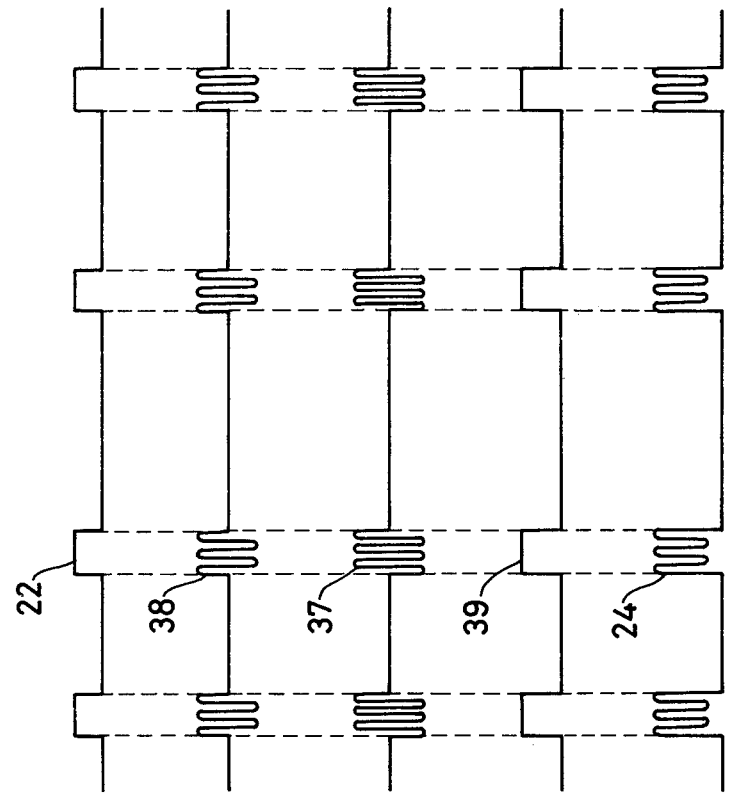
FIG. 7A to FIG. 7G are wave forms of signals at different parts of the time signal generator of FIG. 6.

Accordingly, the chromaticity signal (R−Y) modulated by the chrominance subcarrier S′, namely a modulated chrominance signal 38 as shown in FIG. 7D is obtained from an output terminal O of the balanced modulator 15b in accordance with the character signal 22. And the chromaticity signal (B−Y) modulated by the chrominance subcarrier $S_2$, namely a modulated chrominance signal 37 as shown in FIG. 7E is obtained from an output terminal O of the balanced modulator 15a in accordance with the character signal 22.

On the other hand, the luminance signal Y obtained from the DA converter 35c is supplied to the control terminal K of the gain control amplifier 15c. In the gain control amplifier 15c, the level of the input signal applied to the input terminal A is controlled by the control signal applied to the control terminal K. The character signal 22 is supplied to the input terminal A of the gain control amplifier 15c, and controlled in level by the luminance signal Y. Thus, a character signal 39 shown in FIG. 7F is obtained from the output terminal O of the gain control amplifier 15c.

The modulated chrominance signals 37 and 38, and the character signal 39 are supplied to the mixer 16, and mixed with each other therein. As the result, a video signal 24 shown in FIG. 7G, in which the chrominance signal is overlapped on the character signal 39, is obtained from the mixer 16. The phase of the chrominance signal of the video signal 24 varies as 347 degrees (blue)→284 degrees (cyanic)→241 degrees (green)→167 degrees (yellow)→104 degrees (red), by 243 degrees (347 degrees −104 degrees), as shown in FIG. 3.

As the result, the hue of the character 31 to display time varies every second in the order of wave lengths of colors, as blue→cyanic→green→yellow→red→blue, and also the luminance varies every second.

While there have been described two embodiments, various modifications are possible on the basis of the spirit of this invention.

The hue of the character may be varied as red→blue in the reverse order. Although the hue of the character is varied every second as blue→red at the period of one minutes, in the above embodiments, it may be varied every minute as blue→red at the period of one hour. In that case, minute clock pulses are supplied from the counter 14 of FIG. 1 or FIG. 6. Alternatively, it may be varied as blue→red at the period of a few hours such as the morning rush hours.

And, the hue of the character of minute unit may be varied as blue→red→blue at the period of one minute, while the hue of the character of hour unit may be varied as blue→red→blue at the period of one hour. In that case, time is displayed with two different hues.

Although the time is displayed by numerals in the above embodiments, the time, any remaining time or any kind of time may be displayed by characters other than numerals, figures, symbols, color or combinations of them with different time signals.

And although the hue and luminance of the character 31 to display time are varied with time in the above second embodiment, only one of the hue and luminance may be varied.

What is claimed is:

1. A television time signal generator, comprising: a pattern signal generator for generating a pattern signal for time display of numerals on a television picture tube and means for applying to said pattern signal a color component which varies in a predetermined order in accordance with a passage of time, whereby the color of said time display is varied in said predetermined order to represent the value of time increments.

2. A television time signal generator according to claim 1, in which said color component includes a chrominance signal, the phase of the chrominance signal being varied in accordance with a passage of time.

3. A television time signal generator according to claim 1, in which the color of said time display is varied in the order of wavelengths of colors in accordance with the passage of time.

4. A television time signal generator according to claim 2 in which the chrominance signal is formed by the phase shift of a chrominance subcarrier, and which includes a delay circuit for delaying the chrominance subcarrier and a control circuit for controlling said delay circuit to periodically change the delay time at every time unit in a predetermined time cycle.

5. A television time signal generator according to claim 4, in which said delay circuit comprises plural delay lines different from each other in delay time, said chrominance subcarrier being applied to the input of said delay circuit; a counter for counting clock pulses corresponding to said time unit, one or more of said delay lines through which said chrominance subcarrier passes being selected in a predetermined order in response to the output of said counter to change the delay time of said chrominance subcarrier at every time unit periodically in said predetermined time cycle; a modulator in which said chrominance subcarrier having passed through said selected delay lines is modulated by the pattern signal from said pattern signal generator; and a mixer to which the output of said modulator is supplied as a chrominance signal, and said pattern signal from the pattern signal generator is supplied as a luminance signal, to obtain a composite video signal.

6. A television time signal generator according to claim 1, in which the color component includes a chrominance signal, said chrominance signal being formed in accordance with levels of two chromaticity signals, and the levels of said two chromaticity signals being varied in accordance with passage of time.

7. A television time signal generator according to claim 6, in which there are provided:
   (a) first and second chromaticity signal forming means for forming first and second chromaticity signals the levels of which vary at every time unit periodically in a predetermined time cycle;
   (b) a luminance signal forming means for forming a luminance signal the level of which varies at every time unit periodically in said predetermined time cycle;
   (c) first and second modulators in which said first and second chromaticity signals are modulated by chrominance subcarriers different in phase from each other, and which generate modulated signals in response to said pattern signal;
   (d) an amplitude control circuit for controlling the amplitude of said pattern signal in accordance with the level of said luminance signal; and
   (e) a mixer to which the outputs of said first and second modulators are supplied to form the chrominance signal, and to which the output of said amplitude control circuit is supplied to obtain a composite video signal.

8. A television time signal generator according to claim 7, in which said first and second chromaticity signal forming means and said luminance signal forming means respectively comprise digital-analog converters to which outputs of a Read-Only Memory are supplied to form said first and second chromaticity signals and said luminance signal, said Read-Only Memory storing level information corresponding to each level of said first and second chromaticity signals and said luminance signal at each time unit in said predetermined time cycle, said level information being read out with outputs of a counter for counting clock pulses corresponding to said time unit.

* * * * *

UNITED STATES PATENT AND TRADEMARK OFFICE
CERTIFICATE OF CORRECTION

PATENT NO. : 4,163,361

DATED : August 7, 1979

INVENTOR(S) : Tsuneo Mikado

It is certified that error appears in the above-identified patent and that said Letters Patent are hereby corrected as shown below:

Page 1, [75] Inventor, delete "Hachioji" and insert -- Meguro --;

Signed and Sealed this

*First* Day of *January 1980*

[SEAL]

*Attest:*

SIDNEY A. DIAMOND

*Attesting Officer*　　*Commissioner of Patents and Trademarks*